UNITED STATES PATENT OFFICE.

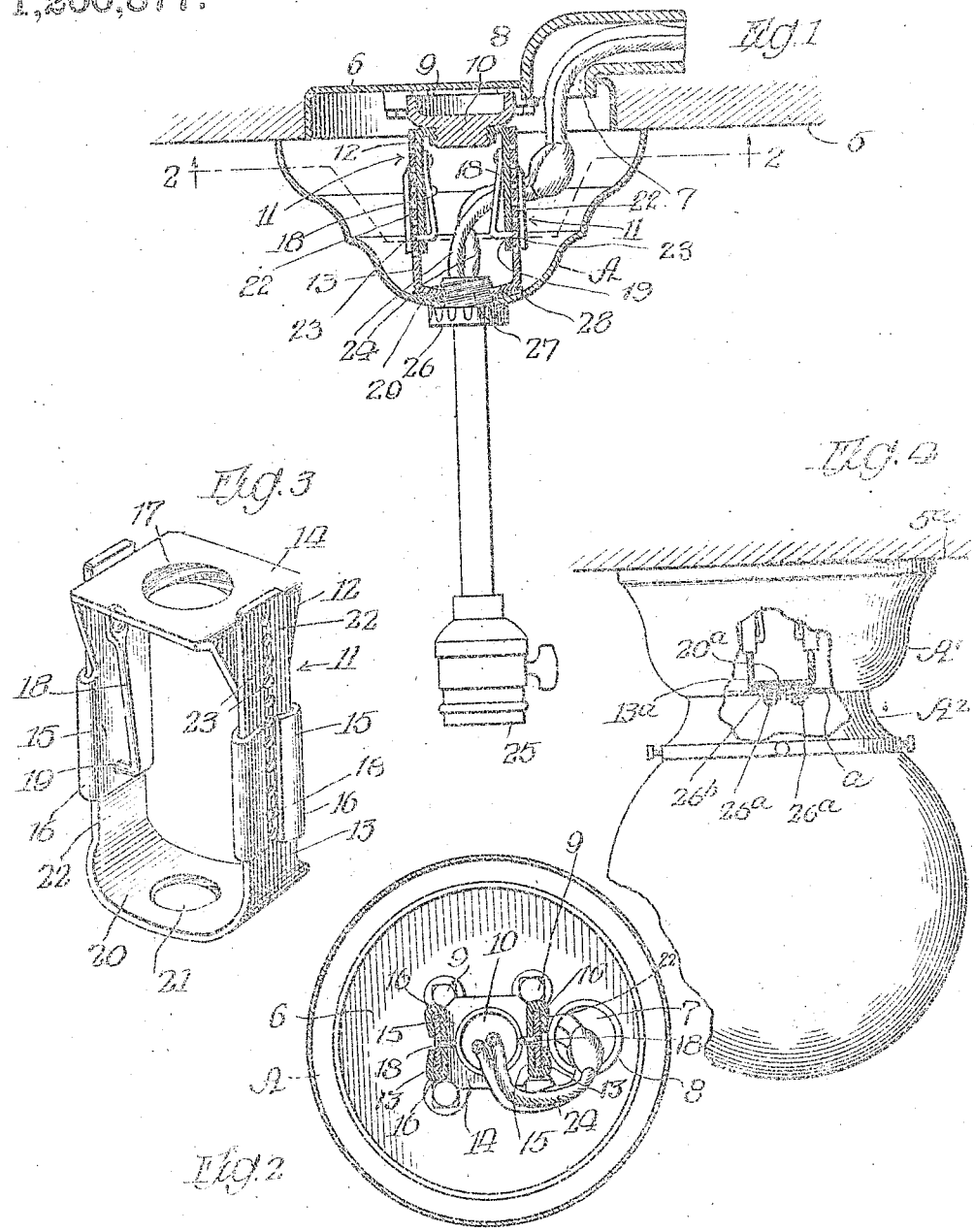

ALBERT E. SABLE, OF MAYWOOD, ILLINOIS.

CANOPY-HOLDER FOR LIGHTING-FIXTURES.

1,200,877.

Specification of Letters Patent.

Patented Oct. 10, 1916.

Application filed June 19, 1916. Serial No. 104,387.

*To all whom it may concern:*

Be it known that I, ALBERT E. SABLE, a citizen of the United States, and a resident of Maywood, county of Cook, and State of Illinois, have invented certain new and useful Improvements in Canopy-Holders for Lighting-Fixtures, of which the following is declared to be a full, clear, and exact description.

This invention relates to canopy holders for lighting fixtures, and its principal object is to provide a holder capable of holding several sizes of canopies in fixed relation to the ceiling or other object to which the lighting fixture is attached.

Another object is to provide a holder which may be quickly and easily secured in place, and to which or from which the canopy may be readily attached or detached.

With these and other objects in view, this invention consists in the several novel features of construction, arrangement and combination of parts, which are fully set forth and claimed in the following specification.

The invention is clearly illustrated in the accompanying drawing, in which:—

Figure 1, is a view partly in side elevation and partly in central, vertical section of a canopy holder embodying a simple form of the present invention; Fig. 2, is a horizontal section taken on line 2—2 of Fig. 1; Fig. 3, is a perspective view of the canopy holder and Fig. 4, is a side elevation, partly broken away, of a slightly modified form of the invention.

Referring to said drawing, 5, designates the ceiling or wall of a room, upon which is supported a box 6, having one or more openings 7, through which extends one end of the wire containing conduit 8. A plug 9, having a screw-threaded neck 10, formed thereon, is bolted to the box 6, in the usual and well-known manner. The canopy holder 11, is made of two holding members 12, 13, attachably and detachably connected together. The upper or base member 12, comprises a flat base portion 14, from the two ends of which project two parallel downwardly extending arms 15, 15, the side edges of which, through a portion of their extent, are bent back upon themselves as clearly seen at 16 in Figs. 2 and 3, to form guideways for the reception of certain arms of the lower holding member 13. The base 14, has a centrally located screw-threaded hole 17, whereby the holder may be screwed upon the screw-threaded neck of the plug 9. To the inner sides of the arms 15, are riveted or otherwise secured two hooks or detents 18, the tapered ends of which project through holes 19, formed in the arms 15; said hooks or detents are made of elastic material, and are arranged to press outward through said holes 19.

The lower canopy holding member 13, has a crosspiece 20, formed with a centrally located aperture 21, and at the ends of said crosspiece, said member 13, is formed with two upwardly extending parallel arms 22, fitting in and slidably held in said guideways 16, by the hooks or detents 18, which project through holes 23, that are formed in said arms 22. The holes 23, are arranged in line with the holes 19, so that when the arms 22, are slid up in the guideways 16, the hooks 18, may spring into the holes 23, and retain the lower canopy holding member in place on the upper one.

The canopy A, is of the usual form employed to cover the wire connections and box 6, and has a central opening through which the conductor cords 24, extend down to the socket 25. A bushing 26, formed of non-conducting material surrounds the conductor cords and has a screw-threaded neck or reduced portion 27, which screws into the hole 21, in the lower canopy holding member 13. A strip of fiber or other non-conducting material 28, is interposed between the bottom of said member 13, and the canopy A, to guard against short-circuiting therebetween.

In use, the holder is screwed upon the plug 9, the conductor drop cords 20, inserted through the hole 21, and the connections made with the house wire. The lower canopy holding member 13, should be adjusted as far down as found necessary to accommodate the canopy. The fiber strip 28, canopy and bushing 26, are then slipped over the conductor cords and the canopy pushed up against the lower holding member until the upper edge of the canopy seats against the ceiling. At this time the hooks 18, should enter two holes 23, in the arms 22, thereby positively connecting the two members 12, 13, but it may happen that the arms 22, stop with the protruding ends of the hooks standing intermediate two adjacent pairs of holes 23. In this event the bushing 26, when screwed home against the bottom of the canopy, acts to draw the lower holding member back far enough to bring the next adjacent holes in the arms 22, into register with the hooks, whereupon they snap into the holes 23, and rigidly connect together the two members 12, 13. The electric socket 25, may now be attached to the conductor cords in the usual manner.

To detach or lower the canopy for any purpose, the bushing 26, is unscrewed. If it is desired to adjust the lower holding member in a downward direction the hooks are retracted from the holes and moved to one side; the lower member 13, is then pulled down and the hooks replaced in the holes 19; the parts are then ready for reassembling.

In the modified form illustrated in Fig. 4, a ceiling light is shown. The canopy $A^1$ is interposed between a shade or globe holder $A^2$, and the ceiling $5^a$. The globe holder has an end piece $a$, which fits against the crosspiece $20^a$, of the lower holding member $13^a$ and is secured thereto by screws $26^a$, which pass through bushings $26^b$, formed of fiber or other non-conducting material, and are threaded in the crosspiece $20^a$, of the lower holding member $13^a$. A strip of fiber or other non-conducting material interposed between said member $13^a$, and end piece $a$, of the shade holder prevents a short-circuit between the canopy holder and shade support.

More or less variation of the exact details of construction shown and described is possible without departing from the spirit of this invention. I desire, therefore, not to limit myself to the exact forms of construction shown and described, but intend in the following claims to point out all of the invention disclosed herein.

I claim as new and desire to secure by Letters Patent:—

1. A canopy holder comprising two canopy holding members, each having lengthwise extending parallel arms, slidably secured to the arms of the other member, the arms of one member having rows of perforations and the arms of the other member having hooks adapted to enter said perforations, one of said members having an internally screw-threaded end piece adapted for attachment to a supporting plug, and the other member being arranged to abut against a canopy, and a threaded connection for clamping the canopy against the lower canopy holding member.

2. A canopy holder comprising an upper and a lower canopy holding member, the one being formed with guideways, and the other with arms sliding in said guideways, said last mentioned arms having rows of perforations, hooks on the first mentioned arms adapted to enter said perforations, one of said members being formed with means for attachment to a support, and a clamping element for securing a canopy to the other member.

3. A canopy holder, comprising an upper holding member having an internally screw-threaded base portion and two parallel arms extending therefrom, said arms being formed with guideways, and there being hooks secured to said arms, a lower holding member, having a crosspiece, formed with two parallel arms extending therefrom and slidably guided in said guideways, each of said arms having a lengthwise extending row of perforations into which a hook enters, and canopy clamping means engaging with said lower holding member.

4. A canopy holder comprising an upper holding member, having an internally screw-threaded base portion and two parallel arms extending therefrom, the side edges of which are bent back upon themselves to form guideways, a lower holding member having a crosspiece and two parallel arms slidably guided in said guideways, elastic hooks secured to the arms of one holding member and adapted to snap into holes formed in the arms of the other member, and canopy clamping means threaded in said crosspiece, for clamping a canopy against said crosspiece.

5. A canopy holder comprising an upper holding member having an internally screw-threaded base portion and two parallel arms extending therefrom, the side edges of which are bent back upon themselves to form guideways, a lower holding member having a crosspiece and two parallel arms slidably guided in said guideways, spring hooks secured to the arms of the upper holding member and arranged to snap into holes which are formed in the arms of the lower holding member, said holes being arranged in rows extending lengthwise of the arms, and a bushing threaded in the crosspiece of the lower holding member and arranged to clamp a canopy against said crosspiece.

ALBERT E. SABLE.